:::: {.flex}

::::

(12) United States Patent
Van Damme

(10) Patent No.: US 8,142,178 B2
(45) Date of Patent: Mar. 27, 2012

(54) DEVICE FOR DESOLVENTISING UNDER REDUCED PRESSURE

(75) Inventor: Joseph Van Damme, Hove (BE)

(73) Assignee: N.V. Desmet Ballestra Engineering S.A., Zaventem (BE)

( * ) Notice: Subject to any disclaimer, the term of this patent is extended or adjusted under 35 U.S.C. 154(b) by 847 days.

(21) Appl. No.: 12/175,859

(22) Filed: Jul. 18, 2008

(65) Prior Publication Data

US 2009/0035428 A1     Feb. 5, 2009

(30) Foreign Application Priority Data

Aug. 1, 2007 (EP) .................................. 07447046

(51) Int. Cl.
*A23L 1/20* (2006.01)
(52) U.S. Cl. .......... 425/203; 426/489; 422/273; 100/73; 100/148
(58) Field of Classification Search ................... 426/312; 425/203
See application file for complete search history.

(56) References Cited

U.S. PATENT DOCUMENTS

| | | | |
|---|---|---|---|
| 1,988,648 A | | 1/1935 | Engelke |
| 2,184,248 A | * | 12/1939 | Bonotto ........................ 422/273 |
| 2,461,694 A | | 2/1949 | McCubbin et al. |
| 2,470,652 A | | 5/1949 | Scofield |
| 2,571,143 A | | 10/1951 | Leslie |
| 2,674,609 A | | 4/1954 | Beal et al. |
| 2,678,327 A | | 5/1954 | Clayton |
| 2,691,830 A | | 10/1954 | Karnofsky |
| 2,713,023 A | | 7/1955 | Irvine |
| 2,746,168 A | * | 5/1956 | Rickabaugh .................... 34/559 |
| 2,804,427 A | | 8/1957 | Suriano |
| 2,826,601 A | | 3/1958 | Barsky |
| 2,983,612 A | | 5/1961 | Eichberg |
| 3,310,487 A | | 3/1967 | Johnson et al. |
| 3,367,044 A | | 2/1968 | Fitch |
| 3,389,974 A | | 6/1968 | Barattini et al. |
| 3,392,455 A | | 7/1968 | Klingsbaker, Jr. et al. |
| 3,634,201 A | | 1/1972 | Kehse |

(Continued)

FOREIGN PATENT DOCUMENTS

BE     877839     1/1980

(Continued)

OTHER PUBLICATIONS

U.S. Appl. No. 12/175,837, filed Jul. 18, 2008, Kellens et al.

(Continued)

*Primary Examiner* — Anthony Weier
(74) *Attorney, Agent, or Firm* — Wegman, Hessler & Vanderburg

(57) ABSTRACT

The invention provides a continuous process for removing organic solvents from a marc including the steps of: continuously introducing the marc into a desolventiser; introducing an inert, gaseous stripping medium into the desolventiser; removing the organic solvents from the marc by maintaining a sub-atmospheric pressure inside the desolventiser, thus providing an organic solvent-desolventised material; and continuously extracting the organic solvent-desolventised material from the desolventiser; wherein step (a) and (d) comprise compacting the marc and the organic solvent-desolventised material into a first and second plastic, substantially gas-impermeable mass respectively and extruding the first and second plastic mass through an annular gap, the opening of which is controlled by the rate of supply of the first and second plastic mass. The invention also provides a device for compacting a moist organic material into a first plastic gas-impermeable mass which is useful for implementing this process.

4 Claims, 2 Drawing Sheets

U.S. PATENT DOCUMENTS

| | | | |
|---|---|---|---|
| 3,966,445 A | 6/1976 | Adams et al. |
| 4,049,686 A | 9/1977 | Ringers et al. |
| 4,089,880 A | 5/1978 | Sullivan |
| 4,138,230 A | 2/1979 | Thompson |
| 4,164,506 A | 8/1979 | Kawahara et al. |
| 4,415,443 A | 11/1983 | Murphy |
| 4,601,790 A | 7/1986 | Stage |
| 4,664,784 A | 5/1987 | Harandi |
| 4,778,489 A | 10/1988 | Weber |
| 4,996,072 A | 2/1991 | Marschner et al. |
| 5,041,245 A | 8/1991 | Benado |
| 5,214,171 A | 5/1993 | Dijkstra et al. |
| 5,401,867 A | 3/1995 | Sitzmann et al. |
| 5,486,318 A | 1/1996 | McKeigue et al. |
| 6,001,220 A | 12/1999 | Hillström et al. |
| 6,013,817 A | 1/2000 | Stern et al. |
| 6,127,560 A | 10/2000 | Stidham et al. |
| 6,172,247 B1 | 1/2001 | Copeland et al. |
| 6,172,248 B1 | 1/2001 | Copeland et al. |
| 6,426,423 B1 | 7/2002 | Copeland et al. |
| 6,623,604 B1 | 9/2003 | Elsasser et al. |
| 6,658,851 B2 | 12/2003 | Jellema et al. |
| 6,953,499 B2 | 10/2005 | Kellens et al. |
| 7,357,074 B2 * | 4/2008 | Kraft et al. ............ 100/117 |
| 2002/0169033 A1 | 11/2002 | Sery |
| 2003/0070317 A1 | 4/2003 | Anderson et al. |
| 2005/0066823 A1 | 3/2005 | Kellens et al. |
| 2006/0030012 A1 | 2/2006 | Kellens et al. |
| 2006/0057263 A1 | 3/2006 | Kellens et al. |
| 2008/0051599 A1 | 2/2008 | Adami et al. |
| 2008/0081097 A1 | 4/2008 | Kellens et al. |

FOREIGN PATENT DOCUMENTS

| | | |
|---|---|---|
| BE | 1005617 A3 | 11/1993 |
| DE | 382912 | 10/1923 |
| DE | 552532 | 6/1932 |
| DE | 1285983 | 1/1969 |
| DE | 2524545 A1 | 12/1975 |
| DE | 265074 A1 | 2/1989 |
| DE | 19520675 A1 | 12/1996 |
| EP | 0195991 A2 | 10/1986 |
| EP | 0520097 A1 | 12/1992 |
| EP | 1157615 A2 | 11/2001 |
| EP | 1505145 B1 | 6/2006 |
| EP | 1624047 B1 | 10/2006 |
| EP | 1637201 B1 | 8/2007 |
| EP | 1818088 A1 | 8/2007 |
| EP | 1894913 A1 | 3/2008 |
| EP | 1905815 A1 | 4/2008 |
| FR | 2103267 | 4/1972 |
| GB | 589534 | 6/1947 |
| GB | 777413 | 6/1957 |
| GB | 789777 | 1/1958 |
| GB | 816522 | 7/1959 |
| GB | 1229266 | 4/1971 |
| GB | 1400836 | 7/1975 |
| GB | 1424049 | 2/1976 |
| GB | 1429773 | 3/1976 |
| GB | 1561494 | 2/1980 |
| GB | 2100613 A | 1/1983 |
| GB | 2176713 A | 1/1987 |
| GB | 2451577 A | 2/2009 |
| JP | 7-284643 | 10/1995 |
| JP | 2002/210399 A | 7/2002 |
| RU | 1781067 | * 12/1992 |
| WO | WO 86/04603 A1 | 8/1986 |
| WO | WO 99/53001 A1 | 10/1999 |
| WO | WO 02/062157 A2 | 8/2002 |
| WO | WO 2005/100519 A1 | 10/2005 |
| WO | WO 2007/082766 A1 | 7/2007 |

OTHER PUBLICATIONS

Andersen, *Refining of Oils and Fats*, 2nd Ed., Pergamon Press, United Kingdom, 1962, pp. 187-199.

Erickson, *Practical Handbook of Soybean Processing and Utilization*, AOCC Press, Champaign, IL, 1995, pp. 246-249.

Kuroda et al., "An Edible Oil Deodorizer with a Direct-Fired Heater," *J. Am. Oil Chem. Soc.* 66:1781-1783, 1989.

Minifie et al., *Chocolate, Cocoa, and Confectionery, Science and Technology*, 2nd Ed., AVI Publishing Company, Inc., Westport, CT, 1980, pp. 67-88.

O'Brien et al., *Introduction to Fats and Oils Technology*, 2nd Ed., AOCS Press, Champaign, IL, 2000, pp. 256-258.

Van Gerpen et al., *Biodiesel Production Technology*, U.S. Department of Commerce, Jul. 2004.

Weber et al., "Fat Crystallizers with Stirring Surfaces: Theory and Practice," *OCL Oléagineux* 5:381-384, 1998.

English Language Explanation of BE 877839.

English Language Explanation of BE 1005617 A3.

English Language Explanation of DE 552532.

English Language Explanation of DE 19520675 A1.

English Language Explanation of JP 7-284643.

English Language Explanation and Machine Translation of JP 2002/210399 A.

European Search Report for European Patent Application No. 04077550 completed Feb. 17, 2005.

European Search Report for European Patent Application No. 06017333 completed Feb. 23, 2007.

European Search Report for European Patent Application No. 06020388 completed Mar. 28, 2007.

European Search Report for European Patent Application No. 07075709 completed Nov. 21, 2007.

European Search Report for European Patent Application No. 07075840 completed Jan. 29, 2008.

Office Action (U.S. Appl. No. 10/912,361), mailed Mar. 19, 2008.

Office Action (U.S. Appl. No. 11/198,084), mailed Dec. 3, 2007.

Office Action (U.S. Appl. No. 11/198,084), mailed Jul. 9, 2008.

Office Action (U.S. Appl. No. 11/226,758), mailed Aug. 18, 2008.

Office Action (U.S. Appl. No. 11/841,255), mailed Sep. 19, 2008.

Office Action (U.S. Appl. No. 10/912,361), mailed Nov. 13, 2008.

* cited by examiner

United States Patent US 8,142,178 B2

DEVICE FOR DESOLVENTISING UNDER REDUCED PRESSURE

CROSS-REFERENCE TO RELATED PATENT APPLICATIONS

This application claims the benefit of European Application No. 07447046.9 filed Aug. 1, 2007, which is herein incorporated by reference.

FIELD OF THE INVENTION

The invention relates to a process and a device suitable for the removal of organic solvents from a marc, and in particular to the removal of organic solvents from an extraction residue subsequent to the extraction of oleaginous materials with organic solvents.

BACKGROUND OF THE INVENTION

For the production of crude triglyceride oils and fats, solvent extraction of oleaginous materials has been a widely practiced process for almost a century. If the oil or fat content of the oleaginous material is high, for instance above 20% by weight or more, the solvent extraction process may be preceded by a mechanical expelling step but to attain low residual oil levels, extraction is mandatory. Accordingly, an oilseed crushing plant may provide the following treatments: seed purification, seed conditioning, seed flaking to open the oil-containing cells, pressing or expelling the oil from the flakes and producing a cake, extracting the cake with an organic solvent, such as, but not limited to n-hexane, to produce a miscella and a marc, evaporating the solvent from the miscella to produce crude oil and desolventising the marc to produce defatted meal.

More recently, an oleaginous material that formerly was not extracted with a solvent is now also treated by this process but for a different reason. Fishmeal is commonly produced from fatty fish and fish offal by a kind of wet rendering process. In this process, the fishy raw material is comminuted in a shredder and then cooked in water. Liquid is then drained away from the cooked minced material, which is then pressed to expel further liquids. The liquids are separated into an oily phase and so-called stick water, which contains some dissolved proteins and is therefore combined with the expeller cake to yield fishmeal after drying. To prevent the proteins in the fishmeal from denaturing, its temperature is maintained below 80° C. so that the meal is dried under vacuum. However, this fishmeal still contains some oil and for some meal applications, it has to be extracted with an organic solvent.

The reason for this extraction is not so much the isolation of the oil but the removal of the oil from the meal since the oil contains chlorinated hydrocarbons such as, but not limited to, dioxins and pesticide residues, which are concentrated in the oil since these residues are fat-soluble. In the food chain they can therefore accumulate to unacceptably high levels. Accordingly, removing the oil from fishmeal exhibiting such high levels will lower the content of chlorinated hydrocarbons in the meal to acceptable levels, allowing the meal to be used as a feed component in for instance the feed used in fish farming. Consequently, fishmeal may be extracted with an organic solvent yielding a marc that has to be desolventised in such a way that the fish protein does not denature.

Standard desolventisers, as commonly used in the crushing industry, employ a combination of indirect and direct heating with steam to evaporate the solvent. As disclosed in U.S. Pat. No. 4,622,760, the desolventisation proper, by direct action of a desolventising agent, particularly steam, is relieved by interposing before the desolventisation proper a pre-desolventisation with indirect heat transfer, particularly indirect steam heating, and thereby the energy input of the entire system is reduced considerably. Moreover, the drying and cooling of the now solvent-free residue, which follows the desolventisation, can take place in a single, combined stage, whereby further relief of the volume of the apparatus, as well as the energy input, is achieved.

Accordingly, the marc entering the apparatus is first of all heated indirectly. This causes part of the solvent to evaporate but, as long as the material being desolventised still contains some solvent, its temperature will not rise to above the boiling point of the solvent at the prevailing pressure. In a second stage, direct steam causes the remaining solvent to evaporate and the temperature of the material being desolventised to rise to close to the boiling point of water at the prevailing pressure. The treatment of the material being desolventised at this elevated temperature and moisture level is commonly referred to as toasting. In the case of soya bean meal, toasting is an important part of the desolventising process because during toasting, anti-nutritional factors such as, but not limited to anti-trypsin, are denatured as a result of which the nutritional value of the meal increases.

Because the direct steam condenses onto the meal, its moisture content increases, and this assists in the denaturation of the anti-nutritional factors. However, before the meal can be stored, its temperature must be lowered and its moisture content must be reduced to below 13% by weight. This is achieved by blowing air through the toasted material. This air evaporates the water and in doing so cools the material at the same time. However, this air may not be mixed with the solvent vapours in the desolventising compartments because that might lead to the formation of an explosive mixture. Accordingly, the drying and cooling treatments can be applied in a separate vessel. If these treatments are carried out in the same vessel, its top compartments are separated from its bottom compartments, and the material being treated is transported from the top compartments to the bottom compartments by a rotary valve that provides a sufficient barrier for gas to travel from one compartment to the other.

The toasting treatment described above not only eliminates the anti-nutritional factors as present in soya beans, it also causes the water-solubility of the proteins present in the meal to decrease. For some meal applications such as, but not limited to ruminant feed, this is an added advantage but it can also be a disadvantage. For example, the isolation of soya bean protein from soya bean meal demands that this protein is soluble in water and for this reason, toasted soya bean meal is not a suitable starting material for the production of soya isolates; instead, so-called white flakes are used as the starting material. These white flakes have been obtained by desolventising soya marc without toasting this material at the same time. For the nutritional quality of fishmeal used in aquaculture, a low degree of protein denaturation is also desirable, since it increases the feed to fish conversion factor.

U.S. Pat. No. 3,392,455 discloses a process for removing residual volatile substances from a particulate solid material and heat treating the solid material including the steps of determining the maximum temperature that the material should be subjected to during the processing of the material, contacting the material with vapours of the volatile substances, and placing the material in a pressure-tight chamber, placing an inert gas in the chamber, maintaining the temperature of the material in the chamber below the maximum temperature, and varying the time and pressure of processing to remove the solvent. Accordingly, a sub-atmospheric pressure is maintained in the chamber to lower the evaporation temperature of the solvent and thereby prevent the protein from denaturing. However, the process disclosed in U.S. Pat. No. 3,392,455 has the disadvantage that its rotary valves inherently introduce a substantial amount of air when transporting the material.

This disadvantage has been overcome by the apparatus and process disclosed in U.S. Pat. No. 3,367,034, for the continuous separation of solvents from finely-composed or powdery particles, such as pulverized meal, wherein the material is contacted with super heated continuously recycled solvent vapour, flash separating solvent from the material, then contacting the material with an inert gas, then contacting the material with a flow of cold air. Accordingly the apparatus disclosed in U.S. Pat. No. 3,367,034 includes several vapour seal valves, but since these valves are no longer vapour tight, if there is a marked pressure difference across the valves, the apparatus cannot safely operate at sub-atmospheric pressures.

Accordingly, there is still a need for a desolventising system that is capable of operating continuously, at sub-atmospheric pressure, with enhanced gas-impermeability at the feeding and/or discharging ends.

SUMMARY OF THE INVENTION

It has surprisingly been found that both the marc to be desolventised and the desolventised material can yield a plastic mass that can act as a seal and thereby, enables the realisation of a continuous process for the removal of one or more organic solvents from a marc that operates at reduced pressure. Consequently, the process includes the steps of:
(a) continuously introducing the marc into a desolventiser;
(b) introducing an inert, gaseous stripping medium into the desolventiser;
(c) removing the one or more organic solvents from the marc by maintaining a sub-atmospheric pressure inside the desolventiser, thus providing an organic solvent-desolventised material; and
(d) continuously extracting the organic solvent-desolventised material from the desolventiser, wherein step (a) and step (d) include compacting the marc and the organic solvent-desolventised material into a first and second plastic substantially gas-impermeable mass respectively and extruding both the first and second plastic mass through an annular gap, the opening of which is controlled by the rate of supply of the first and second plastic mass. The term plastic mass, as used in disclosing the present invention, means a mass containing sufficient liquid to render the mass plastic.

In order to enhance the gas-impermeability of the seal, it may be advantageous to further wet the materials being compacted, whereby the marc is preferably wetted with the one or more organic solvents and the desolventised material is preferably wetted with water. The term organic solvent, as used in disclosing the present invention, can either mean an organic compound with solvent properties or a mixture of organic compounds with solvent properties. The removal of the one or more organic solvents from the material to be desolventised will increase the water content of this material. Accordingly, the desolventisation according to the process of the present invention may be followed by a drying stage to ensure that the material is no longer prone to microbial attack.

According to one aspect, the invention provides a desolventising process that prevents proteins from denaturing.

According to another aspect, the invention provides an especially designed device suitable for the above desolventising process.

It is an advantage of the process of the invention to desolventise particulate organic material to residual solvent levels below 200 ppm.

It is also an advantage of the process of the invention to provide a desolventising process capable of safely operating below 100° C.

It is a further advantage of the process of the invention to ensure effective desolventisation at low temperature by operating at sub-atmospheric pressure.

It is yet another advantage of the process of the present invention to provide a desolventiser with means that permit the marc to be desolventised to be introduced into the desolventiser, while preventing air from being sucked into the desolventiser when it is operated at sub-atmospheric pressure.

It is also an advantage of the process of the present invention to provide a desolventiser with means that permit material that has been desolventised to be extracted from the desolventiser, while preventing air from being sucked into the desolventiser when it is operated at sub-atmospheric pressure.

It is yet another advantage of the process of the present invention to decrease the amount of non-condensable gas that is introduced into the desolventiser to less than 1 kg gas per ton of material entering the desolventiser.

It is also an advantage of a specific embodiment of the present invention to provide a device with safety valves that stop further air ingress into the desolventiser when its pressure increases unduly or unexpectedly.

The present invention also provides a device used in a continuous process for compacting a moist organic material into a plastic gas-impermeable mass and transferring it into or from a desolventiser maintained at sub-atmospheric pressure, including a cylindrical tube, a helical conveyor capable of rotating in the cylindrical tube, the tube being fitted with a dead-zone preventer, such as anti-rotation bars, and being provided at an exit end with a self-regulating plug forming valve. In a specific embodiment, the valve has a valve seat with a conical recess and a conical plunger capable of being pressed against the valve seat by a pneumatic piston.

These and further advantages of the invention will become apparent from the description and the examples hereinafter.

DETAILED DESCRIPTION OF THE INVENTION

The invention provides good desolventising processes and devices.

A desolventising process according to a first aspect of the invention can be preceded by a solid-liquid extraction process leading to a marc. Since the process according to the first aspect of the invention leads to a product with a low residual organic solvent content and a controlled moisture content, it can be followed by intermediate storage in a silo or some form of packaging. At present, just as an illustration of the utility of the present invention, hexane is the most commonly used solvent for oilseed extraction, but the process of the invention is not limited to the removal of this solvent. It can be profitably used for the removal of one or more organic solvents belonging to various chemical classes (hydrocarbons, ketones, alcohols, carboxylic acid esters, and the like), and especially those solvents, the vapours of which, form explosive mixtures with air.

Figure 2:
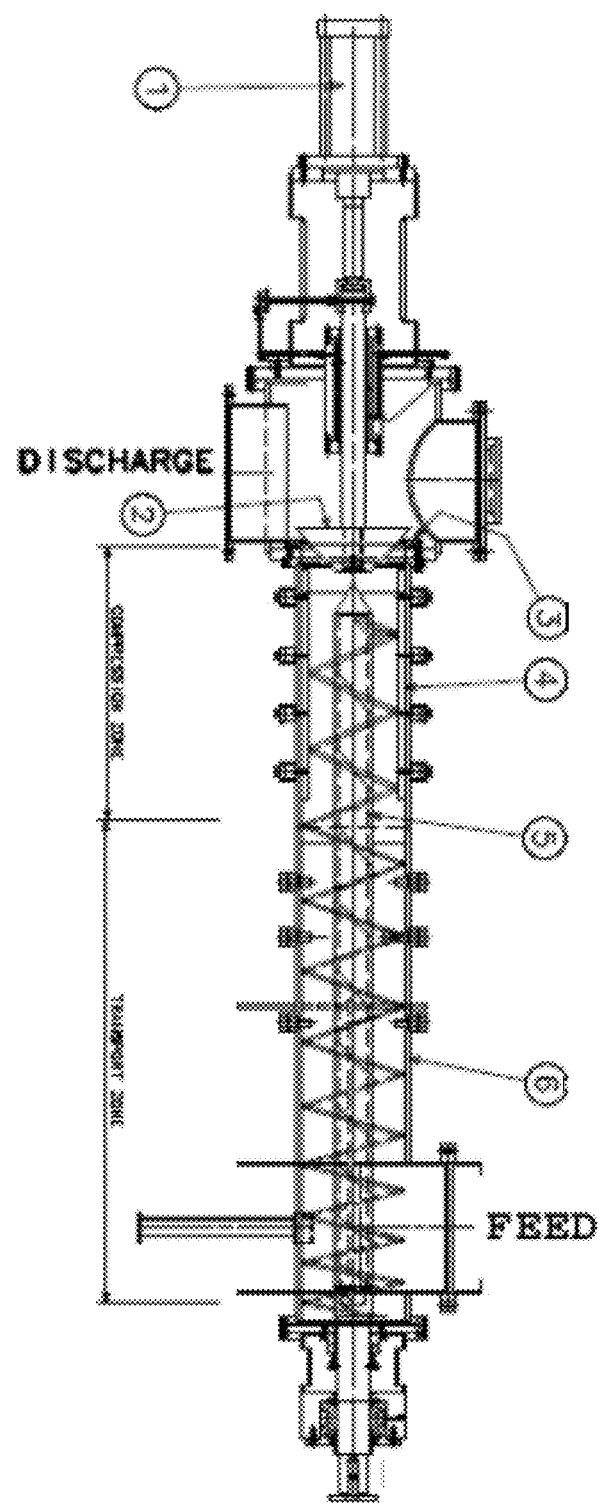
FIG. 2 is a cross section of a device according to a specific embodiment of the invention, showing the feed and discharge of the material being desolventised.

According to one embodiment of the process of the present invention being described with reference to FIG. 2, the marc is fed (e.g., gravity fed) to a conveyor such as a helical screw conveyor (5), that has a transportation zone followed by a compression zone, where the marc is compacted to form the second plastic mass. This mass is pushed by the conveyor against a plug forming valve (the plug avoiding air ingress by transporting material in the form of a substantially gas-impermeable plug or seal), such as a conical valve plunger (2), that is pressed against the valve seat (3), having a conical recess by a pneumatic piston (1), exerting a counter pressure. This counter-pressure may be, for example, from about 0.10 to 0.45 MPa gauge, or from 0.15 to 0.35 MPa gauge. When the force applied by the conveyor exceeds this counter-pressure, the piston will be pushed backwards, causing an annular gap to be formed between the valve plunger (2) and the valve seat (3), which gap will allow compacted material to pass while maintaining a substantially airtight seal. If the supply of material increases, the pressure will increase, and this will push the plunger (2) further back so that the gap is increased, allowing more material to pass.

Figure 1:
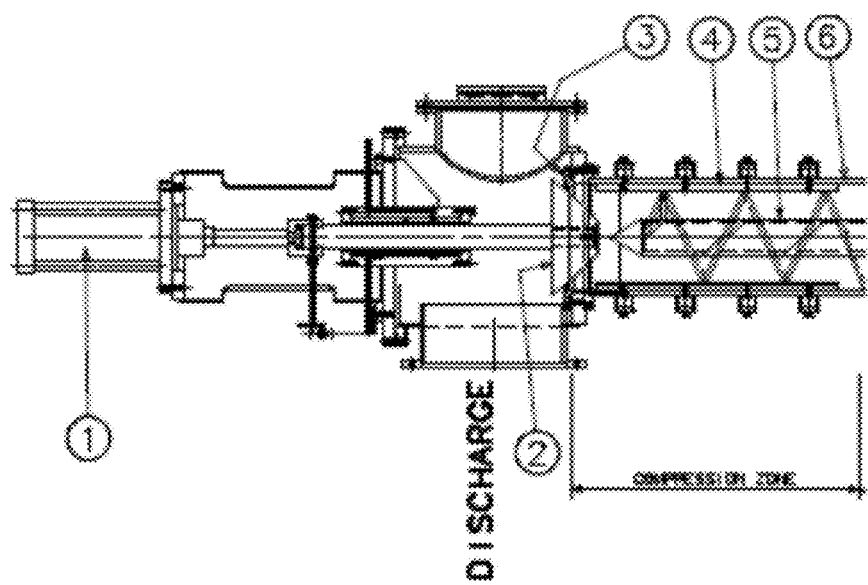
FIG. 1 is a cross section of the valve used in a specific embodiment of the device of the invention.

A gradual increase in bulk density of the material to be desolventised is aimed for by choosing the appropriate designs for the plug forming valve, e.g., the designs of the conical valve plunger and of the shaft end of the helical screw conveyor. The omission of flights, as from a certain distance from the valve seat, also contributes to the progressive compaction of the material being forwarded. In order to avoid a slowdown or absence in this forwarding, a dead-zone prevention means can be provided, e.g., anti-rotation bars (4), may be fitted in the compression zone of the helical screw conveyor as shown in FIGS. 1 and 2. These anti-rotation bars advantageously prevent the screw conveyor from becoming completely filled with material, that would then rotate with the helices and become stagnant. In the transport zone of the helical screw conveyor, one or more breaking bolts may be introduced, as at least part of the dead-zone prevention means.

The cylinder holding the piston may be filled with a compressible gas such as, but not limited to, air or nitrogen, providing a back pressure. The total volume of the compressed gas circuit, including the cylinder volume, an additional reservoir and piping, determines the response time and operability of the system. The gas contained in the circuit is compressed when the piston is moved backwards, its pressure increases so that a higher pressure has to be exerted by the conveyor to maintain the position of the piston.

In a preferred embodiment of the invention, the pressure in the circuit is controlled at a maximum level when the piston has moved beyond a certain distance. Accordingly, gas will be released from the system as soon as this distance is exceeded, and when the piston starts moving forward again, gas is supplemented again to maintain the circuit pressure until the piston reaches the distance. In this way, the amount of gas having been released equals the amount that is supplemented again.

As an advantageous consequence, the system depicted above is provided with a self-regulating plug forming valve, i.e., self-regulating, in that the width of the gap between the valve plunger (2) and the valve seat (3) varies in accordance with the rate of supply of material to be desolventised or having been desolventised. If this rate is high, the valve will open more widely and if the supply stops, the valve will keep its position or start to close. When stationary, there may be some material left between the valve plunger (2) and the valve seat (3), but since this material is substantially gas-impermeable, it provides a seal and greatly impedes air from entering the desolventiser, so as to keep the oxygen concentration well below a safe level and therefore, prevents an explosion to occur.

The solvent content of the marc to be desolventised by the process of the invention is within a range that permits the marc to be compacted to a plastic mass. It therefore, depends on both the type of organic material being desolventised and the type of solvent(s). For hexane extracted soya bean flakes for instance, a hexane content of about 18 to 35% by weight has been found to lead to a plastic mass, but the invention is in no way limited to this range. The skilled person is able to readily determine a suitable range as soon as the exact solvent and exact organic material are defined. If too little organic solvent remains in the marc and a crumbly mass with a lack of cohesion results on compaction, some organic solvent is preferably added. Preferably, the added organic solvent is the same as the solvent used for extraction and thus, already present in the marc, but the invention is not limited to the use of the same organic solvents for extraction and wetting, provided that no miscibility problems occur. The skilled person is able to appropriately select different organic solvents without undue efforts. The organic solvent is preferably added at the beginning of the transport zone of the conveyor, since the conveyor can mix the added solvent into the marc and arrive at a uniform distribution of the solvent(s) throughout the organic material to be desolventised.

In a further embodiment according to the present invention, the extraction medium is exclusive of a hydrocarbon compound which is a gas at atmospheric pressure.

If too much solvent is present in the marc and the material is too soft and sloppy on compaction, the marc should preferably be more effectively drained before being fed to the helical conveyor. Another way to reduce the solvent content of the marc is to incorporate solvent extraction means, such as a cage structure, around the conveyor that permits the excess solvent to be expelled and collected.

The compacted material passing through the annular gap of the valve according to the invention enters the desolventiser proper. In a preferred embodiment of the invention, the desolventiser is of the counter-current type and includes a number of superimposed decks that are swept by the blades of the central agitator. The first plastic mass enters the desolventiser at the top deck and water vapour from below rises through holes or slots in the decks while the material being desolventised passes by gravity through discharge holes to the deck below. The top decks can be heated indirectly by steam and at the lower decks, heat is supplied to the material directly by live steam. This embodiment differs from standard desolventisers in that it is operated under reduced pressure. Accordingly, the vapour duct on top of the desolventiser is connected to an evacuation system and the construction of the desolventiser is such that it can withstand vacuum. Vapours leaving the desolventiser are preferably condensed before reaching the solvent absorption system.

At the lowest point in the desolventiser, the organic solvent-desolventised material is collected by a conveyor system leading to a valve, which system can be identical to the system introducing the marc into the desolventiser. However, whereas the latter includes the possibility of wetting the marc with organic solvents, the exit system includes the possibility of employing water or other liquids as a wetting agent, that causes the desolventised material to form a plastic mass on compaction.

According to the process of the invention, the pressure inside the desolventising vessel can vary over a wide range. Consequently, it can be maintained for instance at absolute pressures of about 800 hPa, or about 400 hPa, or even lower. In fact, the process of the present invention permits the operating pressure to be chosen in function of the properties of the organic material to be desolventised, and of the required specifications for the organic solvent-desolventised material, such as, but not limited to, the Nitrogen Solubility Index (NSI) or the Protein Dispersibility Index (hereinafter PDI). Since the PDI is strongly affected by the desolventising temperature, a preferred embodiment of the process according to the invention selects a desolventisation pressure that corresponds to the water vapour pressure at the temperature above which the material being desolventised should not be heated. If this maximum temperature is for instance 80° C., the pressure inside the desolventiser is preferably maintained at 500 hPa absolute.

Operating the desolventiser under reduced pressure encourages the extraction solvent present in the marc to vaporize. The latent heat needed for this evaporation will lower the temperature of the extraction residue, but by heating the upper decks indirectly with steam, this temperature can be maintained at the boiling point of the extraction solvent at the prevailing pressure; this temperature can be lower than the temperature at which the material has been extracted. Because vacuum desolventisers operate at a lower temperature than those operating at atmospheric pressure, they typically operate with low-pressure steam (below 3 bar gauge) for heating the upper decks, in order to avoid damaging the proteins of the material that is in direct contact with the decks.

The stripping operation causes some steam to condense on the extraction residue and thereby heats it, but its temperature will be limited to the boiling point of water at the prevailing pressure. When the residue has reached this temperature, no more steam will condense on the material, and the steam will rise and condense when meeting material of a lower temperature. Under normal operation, this happens on the top deck where the live steam condenses on meal having a temperature below the azeotropic boiling point of the solvent.

This combined heating and stripping operation has been found to be highly effective in removing the solvent and a residual solvent level of 200 ppm or even lower is easily attained while still respecting the specified maximum temperature of the extraction residue. If the residual solvent level measured on the organic material leaving the desolventiser is found to be higher than desired, lowering its feed rate and thereby increasing its residence time inside the desolventiser, will reduce the residual solvent level.

During operation of the process according to the present invention, the pressure inside the desolventiser is preferably monitored closely to detect any air leaks into the deodorizer. If a sudden rise in pressure is detected of for instance more than 2 hPa per second, and especially more than 5 hPa per second, an air leak may be suspected, and immediate safety measures are required. According to the present invention, these safety measures can involve the rapid closure of slide gate valves mounted on the product inlet and outlet. These valves are preferably slide valves, e.g., constructed in such a way that a barrier is made to slide across the apertures and close these hermetically by being pushed against the valve housing by the pressure difference between the desolventiser and atmosphere. The slide valves may be driven hydraulically or pneumatically to increase speed of operation. The slide of the slide valves may be formed as a knife.

After having been desolventised, the organic material may be too wet for intermediate storage and thus, require drying and possibly cooling. For this purpose air drying is preferred and, if necessary, this can be combined with indirect heating. Drying can suitably be carried out in an additional section of the desolventiser provided underneath the exit valve, or the organic material can be transported to a separate dryer.

According to another aspect, the present invention provides devices particularly suitable for use in the process described herein above. In its broader scope this aspect of the present invention provides a device including a conveyor and a plug forming valve. In an embodiment the device includes a cylindrical tube (6), a helical conveyor (5) capable of rotating in the cylindrical tube (6), the tube being fitted with a dead-zone preventer, and being provided at an exit end with a self-regulating plug forming valve. In an other embodiment of the present invention, the dead-zone preventer is equipped with anti-rotation bars (4) and the self-regulating plug forming valve is equipped with a valve seat (3) having a conical recess and a conical plunger (2) capable of being pressed against the valve seat (3) by a pneumatic piston (1).

In yet another aspect, the present invention provides a desolventiser wherein the feeding of the marc and the discharging of the organic solvent-desolventised material are realised through the device herein above described.

In a specific embodiment of the device of this invention, the pneumatic piston (1) is exerting a counter pressure of for example about 0.10 to 0.45 MPa gauge, or 0.15 to 0.35 MPa gauge.

In another specific embodiment of the invention, the pressure inside the desolventiser can be maintained at a sub-atmospheric pressure, for instance at absolute pressures of about 800 hPa, or about 400 hPa, or even lower. The operating pressure is chosen in function of the properties of the organic material to be desolventised, and of the specifications, such as, but not limited to, the Nitrogen Solubility Index (NSI) or the Protein Dispersibility Index (PDI), which the desolventised material has to meet as described in further details herein above.

In yet another embodiment of the invention, the desolventiser can further include means for measuring and/or controlling the evolution of the pressure inside the desolventiser. Accordingly, if a sudden rise in pressure is detected (e.g., more than 2 hPa per second, especially more than 5 hPa per second), an air leak may be suspected, and immediate safety measures are required, for example, through a slide gate valve having a valve seat, the slide gate valve preventing air ingress into the desolventiser maintained at sub-atmospheric pressure, wherein the slide gate is capable of being pressed against the valve seat of the slide gate valve by the pressure difference between the desolventiser and atmosphere.

What is claimed is:

1. A device for compacting a moist organic material into a plastic gas-impermeable mass and transferring it into or from a desolventiser maintained at sub-atmospheric pressure, comprising a cylindrical tube (6), a helical conveyor (5) capable of rotating in said cylindrical tube (6), said tube being fitted with a dead-zone preventer, and being provided at an exit end with a self-regulating plug forming valve, wherein said device is used in a continuous process for the removal of one or more organic solvents from a marc comprising the steps of:
   a) continuously introducing said marc into a desolventiser;
   b) introducing an inert, gaseous stripping medium into said desolventiser;

c) removing said one or more organic solvents from said marc by maintaining a sub-atmospheric pressure of about 800 hPa or less inside said desolventiser and by stripping vaporized organic solvent from said moist organic material, thus providing an organic solvent-desolventised material;

d) continuously extracting said organic solvent-desolventised material from said desolventiser;

wherein, step (a) and step (d) comprise compacting said marc and said organic solvent-desolventised material into a first and second plastic, substantially gas-impermeable mass, respectively, and extruding said first and second plastic mass through an annular gap, the opening of which is controlled by the rate of supply of said first and second plastic mass.

2. The device according to claim 1, further comprising a slide gate valve having a valve seat, said slide gate valve preventing air ingress into the device, wherein the slide gate is capable of being pressed against the valve seat or said slide gate valve by the pressure difference between the device and the atmosphere.

3. The device according to claim 1, wherein said dead-zone preventer comprises anti-rotation bars (4).

4. The device according to claim 1, wherein said self-regulating plug forming valve comprises a valve seat (3) having a conical recess and a conical plunger (2) capable of being pressed against said valve seat (3) by a pneumatic piston (1).

\* \* \* \* \*